Sept. 24, 1963  J. H. KERLIN  3,104,884
MULTIPLE LAND SEAL
Filed Sept. 24, 1958

INVENTOR.
JOHN H. KERLIN

BY Thomas S. Macdonald
ATTORNEY

United States Patent Office 3,104,884
Patented Sept. 24, 1963

3,104,884
MULTIPLE LAND SEAL
John H. Kerlin, Northridge, Calif., assignor to
North American Aviation, Inc.
Filed Sept. 24, 1958, Ser. No. 763,109
5 Claims. (Cl. 277—206)

This invention relates to a fluid pressure seal and more specifically to a seal for preventing the passage of pressurized fluid between two portions of a housing or two relatively moveable structural surfaces.

Seals of the prior art intended for high pressure applications are generally considered to be difficult to manufacture and install. In order to be assured of an effective seal both the seal surface proper and the structural surfaces to be sealably contacted have had to be made using close tolerance manufacturing techniques and have required special handling after manufacture and particularly great care and skill in installation. Any scoring or scratching of sealing surfaces has created fluid leak paths, bypassing the seal.

These problems have been essentially eliminated by the seal of the present invention by providing an annular channel member having a series of lands on its external periphery. The lands are separated by relatively deep cut grooves, providing a series of individual seals spaced by a series of discrete pressure and fluid traps. The present seal may also include a channel insert ring for assuring positive seal-to-surface contact at low temperatures and/or an indented web forming the bottom of the channel member enabling the seal to fully utilize fluid pressure in effecting an efficient seal.

A principle object of this invention is to provide a seal which is readily adaptable to either static or dynamic applications in sealing against the passage of pressurized fluid.

Another object is to provide a seal with a plurality of sealing surfaces and a plurality of fluid traps.

A further object is to provide a seal which will maintain its ability to seal against the passage of fluid regardless of rough treatment during or prior to assembly.

Yet another object is to provide a fluid seal for low temperature applications.

A still further object is to provide a seal capable of efficiently utilizing fluid pressure to effect a positive seal.

Other objects of invention will become apparent from the following description taken in connection with the accompanying drawings, in which.

Figure 1:
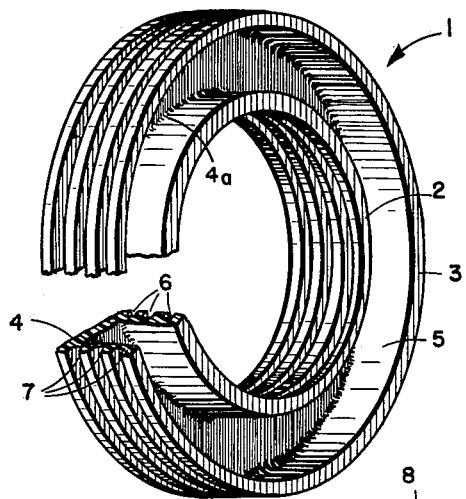
FIG. 1 is a perspective view partially cutaway illustrating the basic seal of this invention.

In FIG. 1 the seal of this invention is generally indicated by numeral 1. Seal 1 has a generally U-shaped cross section as does the other disclosed embodiment. The seal material preferably has elastomeric characteristics which will be more fully discussed hereinafter.

Seal 1 comprises an inner leg or flange 2 and an outer leg or flange 3 generally extending in a parallel relationship to one another and normal to a base portion 4, forming a member channel-shaped in cross-section. Legs 2 and 3 and base portion 4 define the walls of a cavity or annular channel 5. The external peripheral surface of each of legs 2 and 3 contains a series of continuous grooves 6 and lands 7. Grooves 6 are deep cut, extending through approximately one-half the thickness of the leg in which they are contained. The height of each land 7 is at least equal to the land thickness. The land thickness is, in turn, approximately equal to the width of grooves 6. The lands and grooves extend over the effective length or the entire external length of legs 2 and 3 save for the distance required for bevels 8 which may be made when desired on the seal corners (more clearly illustrated in FIG. 2) to facilitate installation. This control of land and groove dimensioning provides a series of fluid traps of useful capacity and a series of lands having a desired degree of flexibility.

Figure 2:
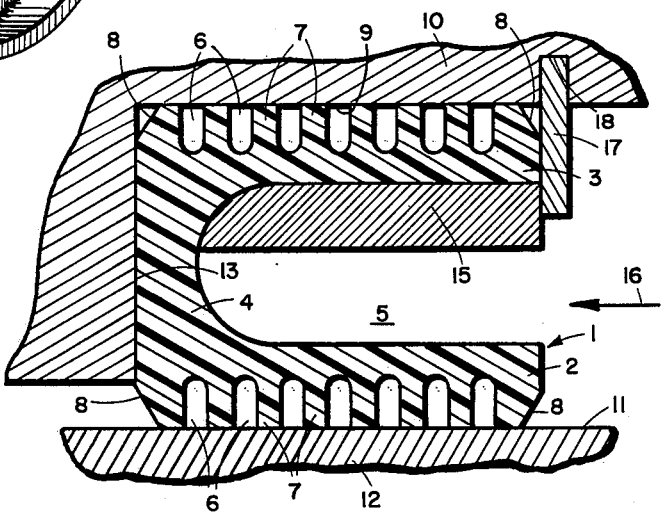
FIG. 2 is a partial cross sectional view of the seal installed between structural surfaces.

FIG. 2 shows essentially the seal of FIG. 1 installed as a low temperature seal between surface 9 of a housing 10 and surface 11 of the structure indicated as 12. This structure may be representative of either a rotatable shaft coaxial with seal 1 to illustrate a dynamic sealing application or of a stationary member for static sealing applications. Here seal 1 has necessarily been inserted into its sealing position from right to left until base portion 4 has come into contact with surface 13 of housing 10. It will be noted that legs 2 and 3 are also parallel to one another in their installed position.

A positive sealing contact may be assured by manufacturing seal 1 with an external diameter slightly greater than the internal diameter of surface 9 and with a seal internal diameter slightly less than the diameter of shaft 12. Upon installation seal 1 is then slightly compressed between the sealing surfaces in an interference fit, assuring an intimate contact between lands 7 and surfaces 9 and 11. The natural resiliency of the seal material with its elastic memory maintains the contact achieved upon installation throughout the period in which the seal is so installed.

In certain instances, when the interference is sufficient and when material flexibility will allow, lands 7 undergo elastic deformation upon installation, resulting in an angular upsetting and displacement of the multiple lands. In such case the lands are inclined toward the entering fluid pressure resultant from the direction of seal insertion. Material elastic memory and fluid pressure acting upon the lands so deformed tends to straighten them to the upright position, moving them into more forceable sealing contact with surfaces 9 and 11. These factors, together with the hereinafter explained action of fluid pressure intermediately of the legs, combine to give an additive effect in initiating and maintaining an efficient fluid pressure seal.

The grooves 6 in conjunction with surfaces 9 and 11 define a multiple series of sealed reservoirs for the progressive entrapment of fluid. Each fluid trap serves to retain a certain volume of fluid and prevent its bypassing the next land. These traps also serve in gaseous sealing applications to progressively reduce pressures by providing expansion reservoirs, acting similar to labyrinth seals.

FIG. 2 further illustrates a channel insert ring 15 disposed within annular channel 5 in contact with the internal periphery of leg 3. Ring 15 makes multiple land seal 1 particularly adaptable for low temperature applications. While using the insert ring the seal has proven useful, for example, as a shaft seal for liquid oxygen, operating with consistently effective results at temperatures approximating —340° F. Seals normally used with fluids in this and lower temperature ranges are inefficient and difficult to control due to the difference in the coefficient of expansion of the seal and the structure material, the seal having the higher coefficient of expansion. This results in a tendency for the seal materials to shrink away from the sealing surfaces. Without insert ring 15 lands 7 have the tendency at low temperatures to shrink away from surface 9 of housing 10. Thus fluid pressure entering from the direction indicated by arrow 16 would easily bypass lands 7 adjacently of surface 9 unless means were provided to prevent movement of seal material radially inward in that area. This is the purpose for which insert ring 15 is provided.

Ring 15 is manufactured from a material, e.g. 36% nickel steel, having a coefficient of expansion less than that of the material, e.g. aluminum, from which either housing 10 or seal 1 are manufactured. When housing 10 and insert ring 15 are so manufactured and simultaneously exposed to extremely low temperatures the radial distance separating them becomes smaller. Any item interposed between the housing and the ring, in the position of seal leg 3 will therefore be subjected to a squeezing action. Thus lands 7 which would normally shrink away from housing 10 will not only be retained in essentially their initial position, but will actually be squeezed between the insert ring 15 and surface 10 into a more forcible sealing contact than prior to low temperature exposure.

Where it is considered necessary due to vibrational characteristics, for example, a retainer or slip ring 17 may be installed within a groove 18 in surface 9 to prevent axial movement of seal 1 and insert ring 15. Other means of holding the insert 15 and/or the seal in axial position will be apparent to those skilled in the art.

It is to be understood that insert ring 15 may be used with any of the seal configurations illustrated, the only limitation being that it must be so located and shaped as to control the radial diametric changes of the seal leg to which it is adapted.

Interior surface 4a of base 4 is shown with a small corner radius in FIG. 1 and with a large radius in FIG. 2. In each case the purpose is to relieve stress concentrations, preventing cracking between the base and the legs.

Figure 3:
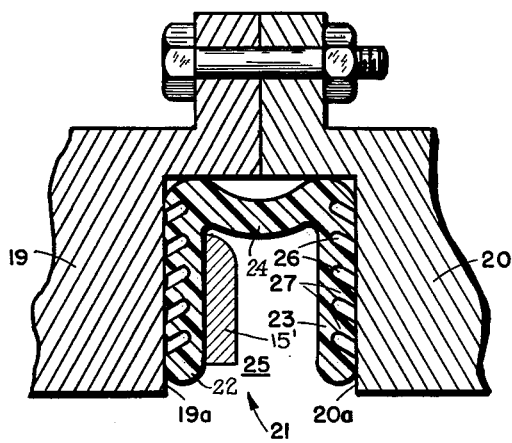
FIG. 3 is a partial cross sectional view of a second embodiment of the invention in a static sealing installation.

FIG. 3 illustrates another embodiment of the seal of this invention installed between surfaces of two housing portions 19 and 20 in a static sealing application. This seal, generally indicated at 21 is similar in construction to seal 1, having legs 22 and 23 extending from base portion 24. However, it will be noted that the legs of seal 21 extend radially inward from base 24 as opposed to the axially extending legs of seal 1. The direction is thus changeable dependent upon the direction from which fluid pressure originates, the legs being always directed toward fluid pressure.

It will be further noted that base 24 is curved or indented into the annular channel 25 formed between the legs and the base. The curvature of base 24 serves to give greater flexibility than does a straight base, allowing legs 22 and 23 to be more easily forced toward one another for the interference fitting described above. It also allows the seal to take full advantage of fluid pressure in achieving a positive seal. Fluid pressure entering between legs 22 and 23 not only acts directly upon the internal surfaces of those legs, urging them outward and into more forcible sealing contact with adjacent structural surfaces 19a and 20a, but it similarly acts upon the internal surface of curved base 24 in an attempt to straighten the base. The base in attempting to straighten exerts an outward force upon legs 22 and 23, again improving the sealing contact between lands and surfaces.

Seal 21 is also manufactured with its lands 27 inclined or canted toward the pressure being sealed and away from base 24. Fluid pressure tending to bypass inclined lands 27 thus enters grooves 26 and exerts a force against lands 27 urging them outwardly toward an upright position and into forcible contact with sealing surfaces 19a and 20a.

The material from which the multiple land seal is constructed may vary dependent upon temperature, pressure and nature of the fluid with which it is used. At ambient temperatures and low pressures relatively soft materials, e.g., rubber, and plastics such as polyethylene, may be readily utilized. More extreme temperature and pressure conditions require less flexible and sensitive seal materials, such as tetrafluoroethylene (Teflon) and chlorotrifluoroethylene (Kel–F).

Resultant from the novel features herein described the multiple land seal of this invention has been successfully utilized in both static and dynamic applications with widely varying pressures and temperatures. It has consistently shown zero leakage under intensive experimental and testing conditions. This desirable and efficient sealing has been maintained even though the tolerance range during manufacture of both the seal and the surfaces to which it has been adapted have been extremely flexible and although only semi-skilled and unskilled labor have been utilized in manufacture and installation procedures. The novel features of the multiple land seal as described may obviously be utilized in varying and interchangeable combinations and although the invention has been described and illustrated in detail, it is to be clearly understood that the same is by way of illustration and example only and is not to be taken by way of limitation, the spirit and scope of this invention being limited only by the terms of the appended claims.

I claim:

1. A low temperature seal for preventing flow of pressurized fluid between two co-axial cylindrical surfaces comprising the combination of a seal member having a flexible, radially extending annular base, and an outer and an inner resilient flange axially extending from said base substantially parallel to one another, each of said flanges being provided with a plurality of continuous lands and grooves upon its external periphery, said lands on one of said flanges being directed generally away from those upon the other of said flanges and extending over the entire effective length of said external peripheries, said seal being axially retained in an interference fit between said cylindrical surfaces, each of said lands being in sealing contact with one of said cylindrical surfaces, each of said grooves forming a fluid trap with one of said surfaces, and an annular ring constructed from a material having a lower coefficient of expansion than said cylindrical surfaces and said seal member, said ring being located radially inward of and in contact with the outer of said flanges and extending from the free end of said outer flange to the point of attachment of said outer flange to said base, said ring retaining said lands upon said outer flange in sealing contact with the outer of said cylindrical surfaces throughout low temperature operational phases.

2. In combination, a fluid pressure seal and an insert ring to adapt said seal for low temperature operation, said seal being an annular channel member having an inner and an outer flange axially extending in parallel relationship from an annular base, said flanges being provided with a series of continuous lands and grooves upon the effective outer peripheries thereof, said insert ring being made of material having a lower coefficient of expansion than said seal and being insertable within said channel member in contact with the entire internal periphery of said outer flange.

3. A pressure responsive fluid seal for sealing between two structural surfaces, said seal comprising an annular channel member including a resilient annular base member, and a pair of resilient legs extending substantially unidirectionally from said base member toward the fluid pressure to be sealed, each of said legs being provided with a plurality of alternately located lands and grooves on its external periphery, said lands adapted to contact the structural surface in sealing relationship, said base member being convexly curved, said convexly curved member extending within said legs and toward said pressure and an insert ring of lower expansion coefficient than said annular channel member interposed between and in contact with one of said legs, whereby said pressure tends to flatten said base member and distend said legs, forcing said legs into positive sealing contact with the structural surfaces.

4. A fluid pressure seal comprising an annular channel member including an annular base portion, and two similarly directed legs flexible with respect to and extending from said base portion and defining an annular channel therewith, said annular base being curved so as to extend into said annular channel, each said leg being provided with a plurality of continuous lands upon a structural periphery of each of said legs, said lands being separated by a plurality of continuous grooves, and an insert ring of lower expansion coefficient than said annular channel member interposed between and in contact with one of said legs, said seal adapted for placement between two structural surfaces such that said lands contact said structural surfaces and such that the free ends of said legs are directed toward the fluid pressure to be sealed, whereby said fluid pressure flexes said annular base member toward a straight position and also flexes said legs outwardly, thus facilitating positive sealing contact between each of said lands and the structural surfaces.

5. A pressure responsive fluid seal comprising a continuous channel member including a base and a pair of substantially unidirectional resilient legs extending from said base so to receive pressure internally of said channel member, each said leg being provided with a plurality of alternately spaced continuous lands and grooves upon its external periphery, and an insert member interposed between said legs in said channel member and in substantially continuous contact with one of said legs and limiting radial movement of said one leg.

References Cited in the file of this patent

UNITED STATES PATENTS

| | | |
|---|---|---|
| 1,939,373 | Tilley | Dec. 12, 1933 |
| 2,467,061 | Mason | Apr. 12, 1949 |
| 2,527,088 | Young | Oct. 24, 1950 |
| 2,610,870 | Parmesan | Sept. 16, 1952 |

FOREIGN PATENTS

| | | |
|---|---|---|
| 25,769 | Great Britain | Nov. 18, 1911 |
| 780,286 | Great Britain | July 31, 1957 |
| 563,738 | Germany | Nov. 9, 1932 |